United States Patent
Leventhal

(10) Patent No.: US 7,735,067 B1
(45) Date of Patent: Jun. 8, 2010

(54) AVOIDING SIGNALS WHEN TRACING USER PROCESSES

(75) Inventor: Adam H. Leventhal, San Francisco, CA (US)

(73) Assignee: Oracle America, Inc., Redwood Shores, CA (US)

(*) Notice: Subject to any disclaimer, the term of this patent is extended or adjusted under 35 U.S.C. 154(b) by 1089 days.

(21) Appl. No.: 11/257,826

(22) Filed: Oct. 24, 2005

(51) Int. Cl.
 *G06F 9/44* (2006.01)
(52) U.S. Cl. .................................. 717/128; 717/127
(58) Field of Classification Search .................. 717/128
 See application file for complete search history.

(56) References Cited

U.S. PATENT DOCUMENTS

| 5,625,821 | A  | * | 4/1997 | Record et al. | ............... | 718/100 |
| 6,698,011 | B1 | * | 2/2004 | Reinders et al. | ............. | 717/124 |
| 7,065,750 | B2 | * | 6/2006 | Babaian et al. | ............. | 717/136 |
| 7,516,453 | B1 | * | 4/2009 | Bugnion | ........................ | 718/1 |

OTHER PUBLICATIONS

Ariel Tamches, "Fine-Grained Dynamic Instrumentation of Commodity Operating System Kernels", 2001, pp. 49-69.*
Richard J. Moore, et al., "IBM Dynamic Probes", http://www-124.ibm.com/developerworks/opensource/linux/projects/dprobes/README, 2000, 4 pages.

* cited by examiner

*Primary Examiner*—Wei Y Zhen
*Assistant Examiner*—Lanny Ung
(74) *Attorney, Agent, or Firm*—Osha • Liang LLP

(57) ABSTRACT

A method for tracing an instrumented program, including triggering a probe in the instrumented program, obtaining an original instruction associated with the probe, loading the original instruction into a scratch space, beginning execution of the original instruction in the scratch space using a thread, detecting a state of a signal received by a signal handler, and if the signal is asynchronous, executing a second instruction corresponding to the signal after executing the original instruction, and if the signal is synchronous, executing a third instruction corresponding to the signal and resetting a program counter to a location of the original instruction where the probe in the instrumented program was triggered.

19 Claims, 5 Drawing Sheets

AVOIDING SIGNALS WHEN TRACING USER PROCESSES

CROSS-REFERENCE TO RELATED APPLICATIONS

This application contains subject matter that may be related to the subject matter in U.S. patent application Ser. No. 10/713,411 filed on Nov. 14, 2003, entitled "Mechanism for Lossless Tracing In An Arbitrary Context.

BACKGROUND

Analyzing the dynamic behavior and performance of a complex software system is difficult. Typically, analysis of a software system is achieved by gathering data at each system call and post-processing the data. Data is gathered at each system call by placing a probe at locations of interest in the software (i.e., instrumenting the software to obtain an instrumented program) and gathering data when the probe is encountered by the thread executing the instrumented program.

Probes are typically represented in the instrumented code as trap instructions. The location (i.e., address) of each trap instruction is stored in a look-up table and associated with an original instruction (i.e., the instruction that is replaced when the program is instrumented).

When a thread executing the instrumented program encounters a trap instruction, control is transferred to a trap handler, which calls into the tracing framework and performs the actions associated with the trap instruction. The trap handler then looks up the original instruction in the look-up table. The trap instruction is then overwritten by the original instruction (i.e., the original instruction is placed back in its original location within the code path replacing the trap instruction that was just executed). The tracing framework then single-steps the original instruction (i.e., the original instruction is executed and then control is returned to the kernel). The original instruction in the code path is then overwritten by the trap instruction that was originally encountered by the thread. The thread then resumes executing the instrumented program.

In a system in which more than one thread is executing within a given instrumented program, a particular thread may not trigger a probe (i.e., encounter a trap instruction) if the thread encounters the original instruction corresponding to a probe as opposed to the trap instruction. This situation typically occurs when a first thread encounters the trap instruction and overwrites it with a corresponding original instruction, and while this is occurring, a second thread encounters the original instruction. In this scenario, the first thread calls into the tracing framework to perform the actions associated with the trap instruction, while the second thread executes the original instruction but does not call into the tracing framework. The aforementioned method for instrumenting a program is typically referred to as "lossfull" (i.e., all the requested tracing information is not obtained, because in certain scenarios such as the one described above, a probe within a give code path may not be encountered by all executing threads).

Alternatively, the original instructions may be replaced with a reserved trap instruction, and when a thread executing the instrumented program encounters the reserved trap instruction, all threads executing in the instrumented program are suspended while the thread that caused the trap single-steps the original instruction, which is temporarily written over by the trap instruction, as defined above. Note that by suspending all the threads executing when the trap is encountered by one of the threads, the execution of the tracing framework is effectively serialized. After the thread has single-stepped the original instruction, the reserved trap instruction that was encountered by the thread is copied back over the original instruction in the code path. All threads executing in the instrumented program then resume executing the instrumented program. The aforementioned method for instrumenting a program is typically referred to as "lossless" (i.e., all the requested tracing information is obtained because the threads executing the instrumented program encounter all the probes in the code path in which they are executing).

Signal handlers are functions that a user-level process registers with a kernel. When a signal is received, the kernel redirects the flow of control from the immediate instruction to the first instruction corresponding to the signal received by the signal handler. Upon completion of handling a signal and the associated instructions, the signal handler returns to the location where it was interrupted. Synchronous signal handlers are designed to handle synchronous signals, which are related to specific instructions. These signals may arise as a result of actions such as, but not limited to, dereferencing a bad pointer, dividing by zero, performing an operation on invalid floating point numbers, etc. Asynchronous signal handlers are designed to handle asynchronous signals, which typically arise because of external events that are possibly unrelated to the current instruction. A timer event from a user-level thread, an external process using a kill command, and hardware interrupts are examples of asynchronous signals.

SUMMARY

In general, in one aspect, the invention relates to a method for tracing an instrumented program. The method comprises triggering a probe in the instrumented program, obtaining an original instruction associated with the probe, loading the original instruction into a scratch space, beginning execution of the original instruction in the scratch space using a thread, detecting a state of a signal received by a signal handler. If the signal is asynchronous, a second instruction corresponding to the signal is executed after executing the original instruction. If the signal is synchronous, a third instruction corresponding to the signal is executed and a program counter to a location of the original instruction where the probe in the instrumented program was triggered is reset.

In general, in one aspect, the invention relates to a system for tracing an instrumented program. The system comprises a thread configured to execute the instrumented program, a look-up table arranged to store an address and a corresponding original instruction, a trap handler configured to halt execution of the thread when a trap instruction is encountered and use an address of the trap instruction to obtain the corresponding original instruction from the look-up table, a scratch space arranged to store the corresponding original instruction, a signal handler configured to detect a state of a received signal, and a program counter. If the state of the received signal is asynchronous, the program counter is configured to execute the corresponding original instruction in the scratch space and execute a second instruction corresponding to the received signal upon completing execution of the corresponding original instruction in the scratch space. If the state of the received signal is synchronous, the program counter is configured to reset execution of the thread to the address of the trap instruction.

In general, in one aspect, the invention relates to a computer readable medium for tracing an instrumented program.

The computer readable medium comprises instructions for triggering a probe in the instrumented program, obtaining an original instruction associated with the probe, loading the original instruction into a scratch space, beginning execution of the original instruction in the scratch space using a thread, and detecting a state of a signal received by a signal handler. If the signal is asynchronous, the computer readable medium comprises instructions for executing a second instruction corresponding to the signal after executing the original instruction. If the signal is synchronous, the computer readable medium comprises instructions for executing a third instruction corresponding to the signal and resetting a program counter to a location of the original instruction where the probe in the instrumented program was triggered.

Other aspects of the invention will be apparent from the following description and the appended claims.

DETAILED DESCRIPTION

Exemplary embodiments of the invention will be described with reference to the accompanying figures. Like items in the figures are shown with the same reference numbers. Further, the use of "ST" in the figures is equivalent to the use of "Step" in the detailed description below.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to methods and apparatus for tracing an instrumented program. More specifically, one or more embodiments of the invention relate to methods and apparatus for controlling program flow when a synchronous or asynchronous signal is encountered in a traced instruction of an instrumented program.

Figure 1:
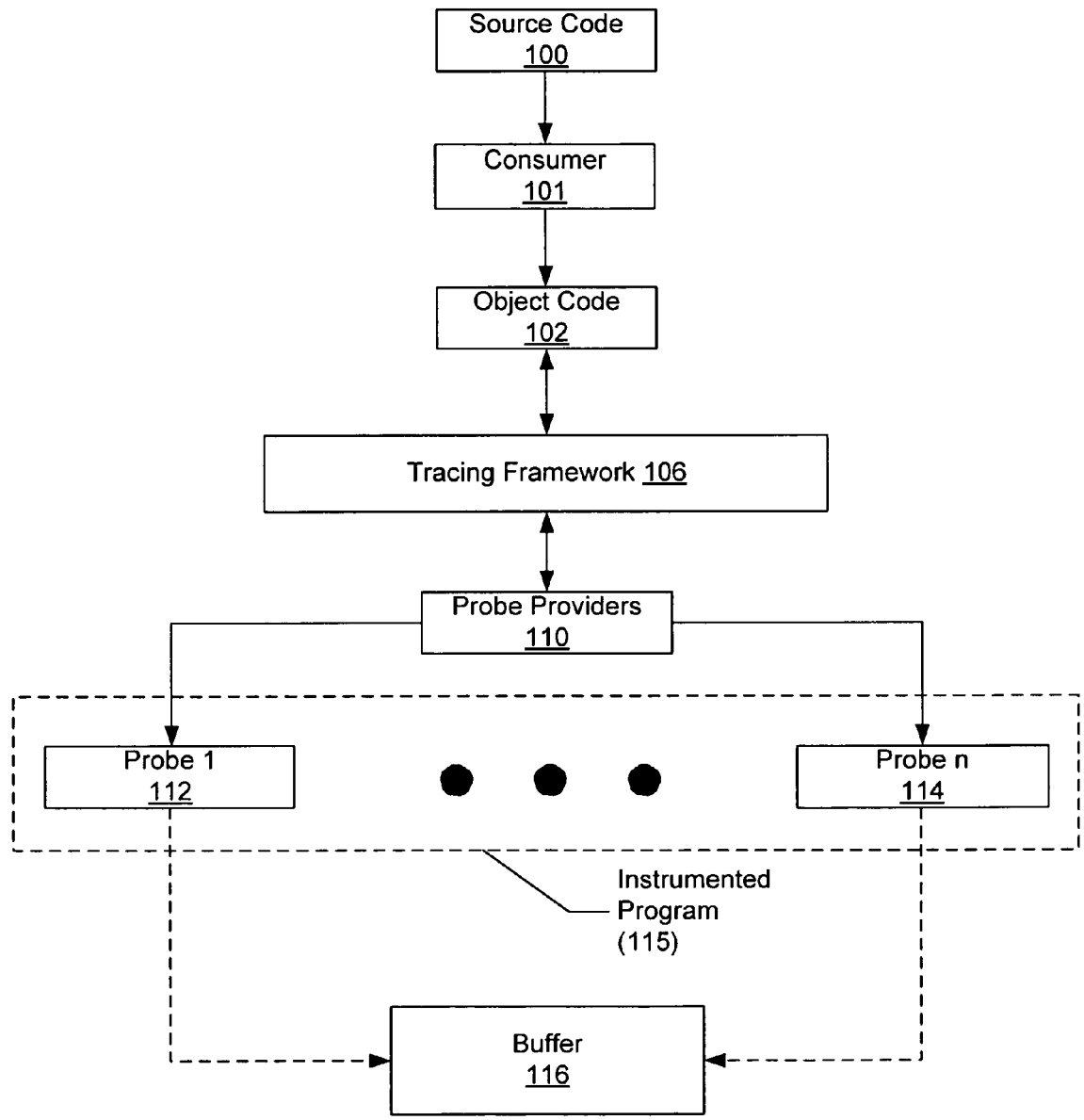
FIG. 1 shows a tracing framework architecture in accordance with an embodiment of the invention.

FIG. 1 shows a flow diagram detailing the collection of data in accordance with one embodiment of the invention. Specifically, FIG. 1 provides an overview of a process for collecting data for a buffer (116). Initially, source code (100) is written/obtained/generated that defines a tracing function (i.e., a request to obtain certain data). More specifically, the tracing function defines which probes (112, 114) to enable within the instrumented program (115), and what actions the tracing framework (106) is to perform when the probes (112, 114) are triggered (i.e., when a thread executing the instrumented program (115) encounters the probes (112, 114)). In one or more embodiments of the invention, a tracing function may define one or more actions that the tracing framework (106) is to perform when a probe (e.g., 112, 114) is encountered.

The source code (100) is typically associated with a consumer (101). Note that a consumer (101) may define one or more tracing functions. The consumer (101) is a virtual client that sends requests, in the form of tracing functions, to the tracing framework (106) to obtain information about the instrumented program (115). Further, the consumer (101) also retrieves the requested information, which is stored by the tracing framework (106) in the associated buffer (116).

The source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (e.g., 112, 114) within the instrumented program (115).

The probes (112, 114) gather the specified information from the instrumented program (115), as defined by the object code (102) derived from the actions defined within the source code (100), and forward the information (directly or indirectly) to a corresponding buffer (116).

In one or more embodiments of the invention, each probe (112, 114) in the instrumented program (115) is represented by a trap instruction. The address corresponding to location of the trap instruction within the instrumented program (115) is recorded in a look-up table along with the original instruction (i.e., the particular instruction that the consumer would like to execute to obtain data). In one embodiment of the invention, the original instruction corresponds to an action that is to be performed when the probe (112, 114) is encountered. The action, as noted above, is typically defined by the consumer (101). In one embodiment of the invention, representing each probe as a trap instruction and generating a corresponding look-up table may be performed by the tracing framework (106).

Prior to the collection of tracing information, one or more probes (112, 114) are activated per a consumer (101) request. The activation of a probe, in accordance with one embodiment of the invention, also includes replacing the original instruction in the instrumented program (115) with a trap instruction and storing the address of the trap instruction and the associated original instruction in a look-up table. In one embodiment of the invention, a scratch space (explained in detail below) is allocated each time a thread is created.

Figure 2:
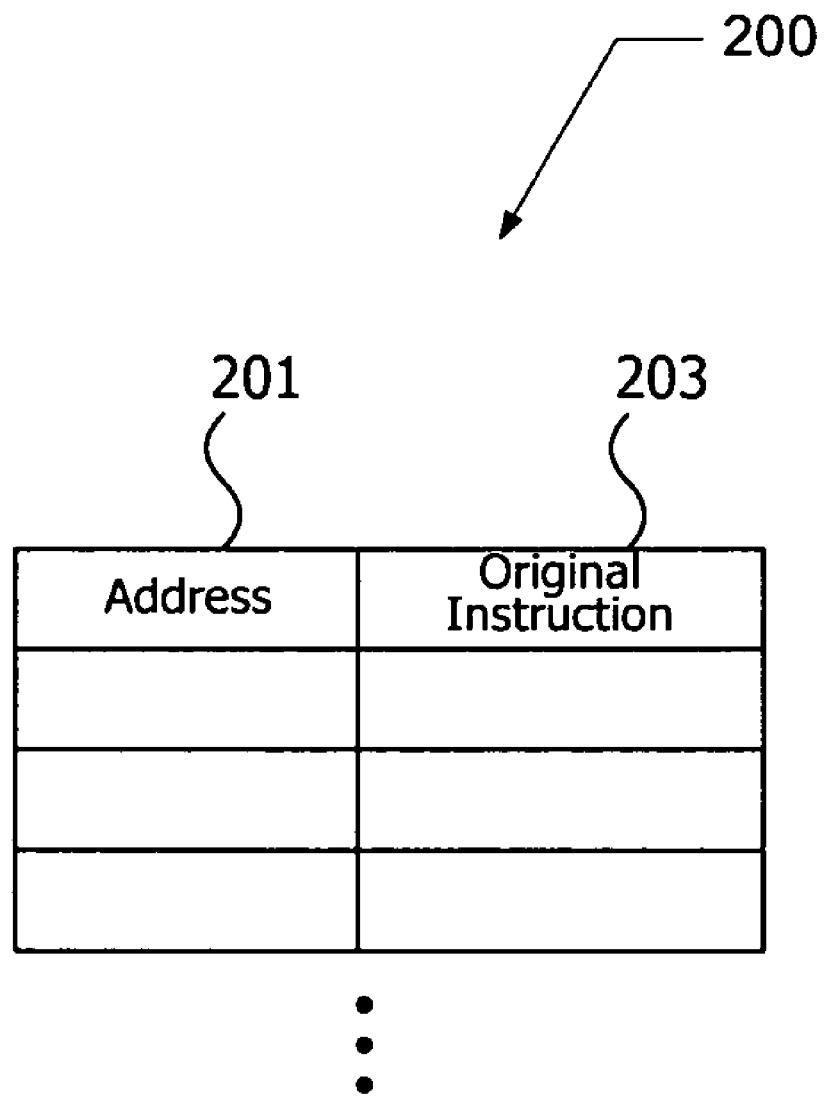
FIG. 2 shows a look-up table layout in accordance with an embodiment of the invention.

FIG. 2 shows a look-up table layout in accordance with one embodiment of the invention. As shown in FIG. 2, the look-up table (200) includes one or more entries, each of which may include an address field (201) storing the address of the trap instruction within the instrumented program (115) and an original instruction field (203) storing the original instruction. The look-up table (200) may also store additional ancillary information needed to specify the address.

Figure 3:
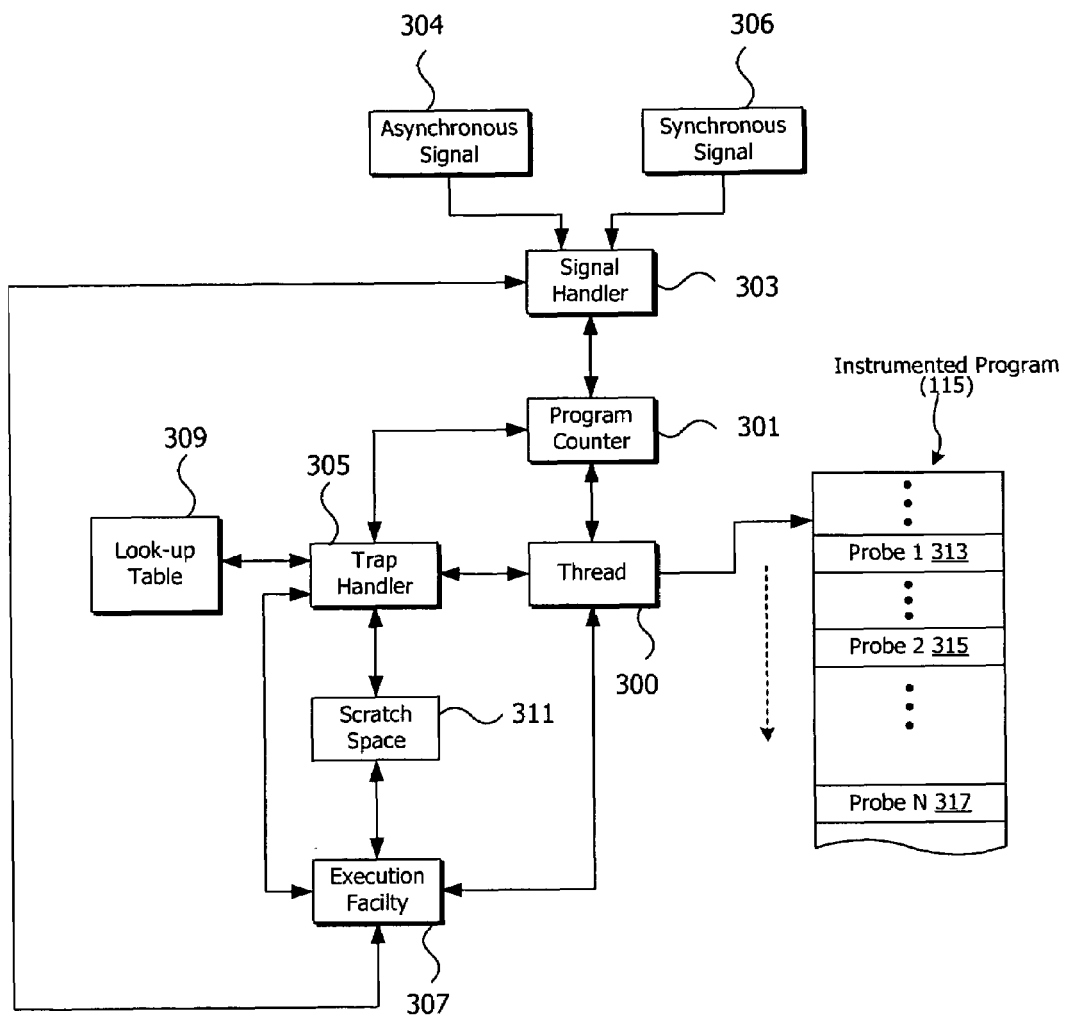
FIG. 3 shows a flow diagram in accordance with an embodiment of the invention.

FIG. 3 shows a flow diagram in accordance with one embodiment of the invention. More specifically, FIG. 3 shows a flow diagram detailing the mechanism for collecting data using a probe in accordance with one embodiment of the invention. Each component in FIG. 3 may be implemented by one or more software modules, hardware components, or any combination thereof. Further, each component shown in FIG. 3 may be distributed across one or more processors.

In FIG. 3, a program counter (301) stores a value corresponding to a current address of a thread (300) executing in the instrumented program (115). When a probe (313, 315, 317), represented by a trap instruction, is encountered by the thread (300), the thread (300) transfers control to a trap handler (305). More specifically, when a probe (313, 315, 317) is encountered, a trap is triggered which is subsequently handled by the trap handler (305). The trap handler (305) searches the look-up table (309), using the program counter (301) value, to obtain the original instruction associated with the probe (313, 315, 317). In addition, the trap handler (305) calls into the tracing framework (106) to perform actions associated with the trap instruction. Those skilled in the art will appreciate that various machine architectures may require additional information, aside from the program counter, to generate an address that may then be used to obtain the original instruction. In this embodiment, the trap handler (305) includes functionality to obtain such information.

Continuing with the discussion of FIG. 3, the original instruction is subsequently loaded into a corresponding scratch space (311). The scratch space (311) is typically a small address range or allocation of an address space that is used to temporarily store the original instruction. In one or more embodiments of the invention, the scratch space resides outside the kernel. In one or more embodiments of the invention, the scratch space is allocated each time a thread is created. If the system upon which the tracing framework (106) executes supports multiple threads in a process, then the scratch space (311) is allocated on a per-thread basis. In one or more embodiments of the invention, the trap instruction is no larger than the size of the smallest original instruction that is to be replaced.

An associated execution facility (307), typically a machine-specific facility, then single-steps the original instruction. In one embodiment of the invention, the execution facility (307) includes functionality to single-step the original instruction. The information collected from single-stepping the original instruction is used to update the state of the execution of the instrumented program (e.g., updating the registers, memory values, etc.).

A signal handler (303) in accordance with one or more embodiments of the invention may include functionality to handle synchronous signals (304), asynchronous signals (306), or both kinds of signals. As a signal handler may cause one or more traced instructions to be executed, a signal must be handled in an appropriate manner to avoid overwriting data or instructions in the scratch space (311). When a signal is received by the signal handler (303) while the original instruction is being single-stepped, the signal is handled based on whether it is a synchronous signal (304) or an asynchronous signal (306). In other words, the program counter (301), the execution facility (307), the scratch space (311), or another element may be modified to accommodate receipt of a synchronous signal (304) or an asynchronous signal (306). Upon completion of handling a signal, the signal handler (303) returns to the exact location where it was interrupted.

Subsequently, the trap handler (305) sets the program counter (301) to point to the original instruction in the scratch space (311), and control is returned to the thread (300) to continue execution of the instrumented program (115). Note that, prior to resuming execution, the thread (or a related process) must increment the program counter to the next instruction within the instrumented program (115). Embodiments for incrementing the program counter (301) are described below.

In one embodiment of the invention, if the original instruction is a control-flow instruction, then the instruction is emulated in software. When the instruction is completely emulated, interruptions due to signals are not an issue. For example, when an asynchronous signal is encountered, it is not dealt with until the instruction is completely emulated. Similarly, when a synchronous signal is encountered, the signal can be detected in emulation code. The program counter as well as any other state in the system that would be modified by the native execution of the original instruction is updated based on the results of the emulation. The trap handler then returns control to the thread (300) at the location indicated by the program counter after the emulation is completed.

Figure 4:
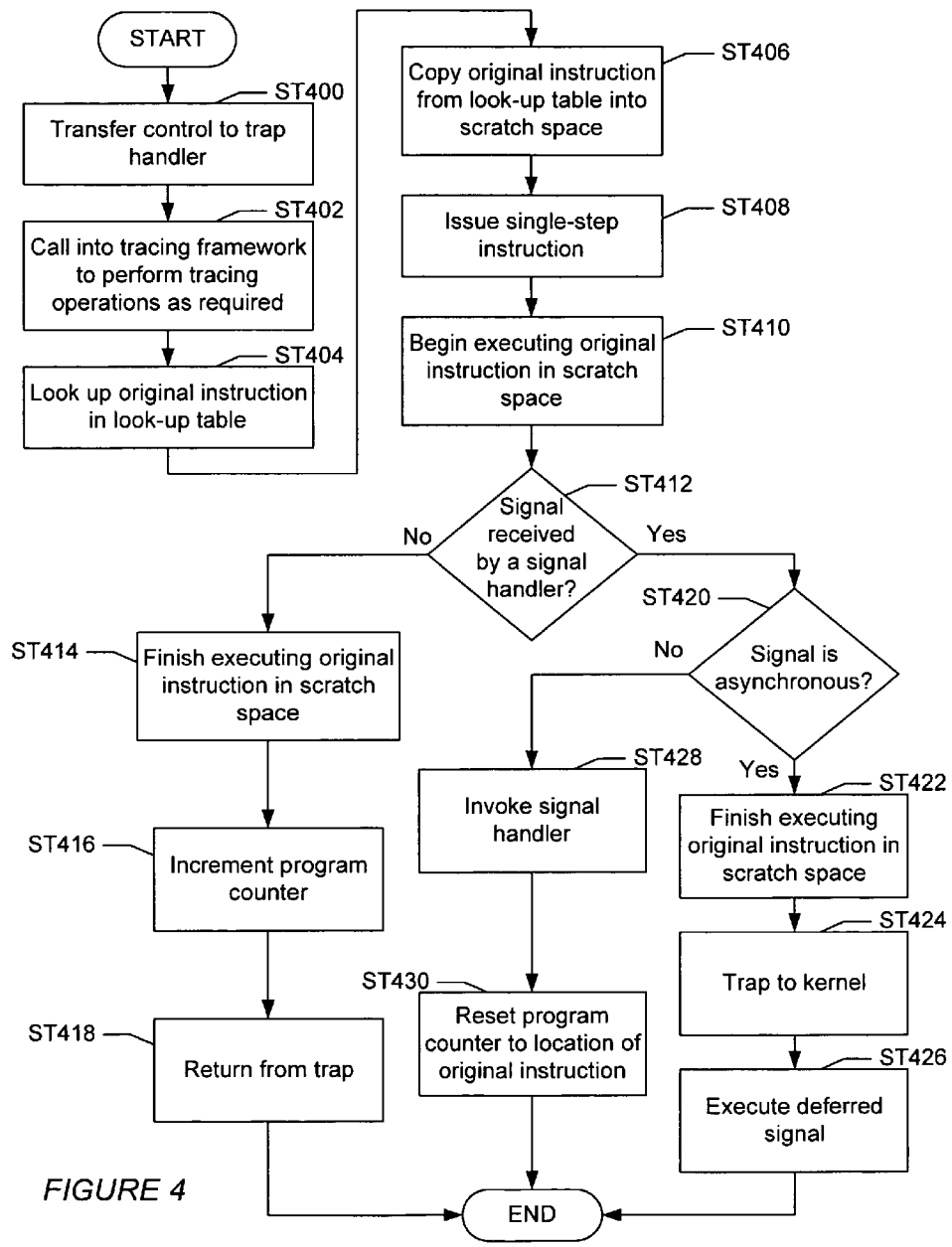
FIG. 4 shows a flowchart in accordance with an embodiment of the invention.

FIG. 4 shows a flowchart detailing the steps that occur when a probe (e.g., a trap instruction corresponding to a probe) is encountered by a thread executing the instrumented program in accordance with one embodiment of the invention. When a thread executing the instruction is encountered, the thread executing the trap instruction transfers control to an appropriate trap handler (Step 400). The trap handler calls into the tracing framework to perform tracing operations as required (Step 402). In one or more embodiments of the invention, the tracing framework performs a tracing operation and generates corresponding tracing information. The tracing information may include, but is not limited to, an argument, a pointer value, a name of a system call, etc. In addition, the tracing operation may correspond to consumer-specified actions that the tracing framework is to perform when the particular trap instruction is encountered.

Continuing with FIG. 4, after the trap handler has made the appropriate calls into the tracing framework, the trap handler queries the original instruction in a look-up table using the location of the trap instruction (and additional information as required) (Step 404). The original instruction is subsequently copied from the look-up table into a scratch space (which may be allocated on a per-thread basis) (Step 406). The trap handler then issues a single step scratch space instruction (Step 408), which updates the program counter to point to the scratch space. Execution of the original instruction by an execution facility then begins in the scratch space (Step 410).

Continuing with the discussion of FIG. 4, a determination is made whether a signal is received by a signal handler (Step 412). If a signal is not encountered after execution of the original instruction begins, the execution facility finishes executing the original instruction in the scratch space (Step 414). The program counter is then incremented by the size of the original instruction (Step 416). In one embodiment of an invention, a single-step handler (not shown) increments the program counter. The trap handler then returns control back to the thread that initially executed the trap instruction (Step 418). The thread then proceeds to continue executing the instrumented program. Executing the original instruction in the scratch space places the instrumented program in a state that is equivalent to the state of the instrumented program, had the original instruction been natively executed.

If a signal is received by the signal handler, a determination is made whether the signal is synchronous or asynchronous (Step 420). If the signal is asynchronous, the execution facility finishes executing the original instruction in the scratch space (Step 422). The trap handler then returns control to the kernel (Step 424). Subsequently, the deferred signal (i.e., the asynchronous signal) is executed (Step 426). In other words, when an asynchronous signal (306) is received, execution of the asynchronous signal (306) is deferred until after the original instruction has been single-stepped by the execution facility (307).

This process may also be viewed as adjusting an address range such that the signal handler (303) executes an instruction corresponding to the received signal upon executing the original instruction. In one embodiment of the invention, a user-level program counter is changed from a first set of instructions (e.g., execute the original instruction, return to the normal subsequent instruction as if the tracing had not occurred) to a second set of instructions that includes finishing execution of the original instruction and ends with a trap into the kernel, so that the deferred asynchronous signal may be handled. One skilled in the art will appreciate that a traced instruction stream will be unaffected by an asynchronous signal, and thus, will appear normal except for the insertion of the asynchronous signal after the executed original instruction.

On the other hand, if a determination is made that the signal is synchronous, execution of the original instruction cannot be completed, as it caused the synchronous signal. Thus, the signal is handled immediately. In other words, the signal handler is invoked, and the synchronous signal is executed (Step 428). Then, the program counter is reset to the location in the scratch space of the original instruction that was interrupted by the synchronous signal (Step 430). One skilled in the art will appreciate that the order of Steps 428 and 430 may be reversed without affecting a result of the involved instructions.

One skilled in the art will appreciate that a traced instruction stream may show that an original instruction interrupted by a synchronous signal was executed twice, i.e., once when the original instruction was executed before receipt of the synchronous signal, and once after the synchronous signal is executed. This allows a great amount of flexibility in handling received signals. For example, a thread may be issued to call an exit function and display a traced instruction stream to determine the instruction that gave rise to the synchronous signal. Alternatively, instruction code or a data/address register may be modified before the program counter is reset to the location in the scratch space of the original instruction, to attempt to correct the cause of the synchronous signal. Thus, when the instruction that gave rise to the synchronous signal is executed the second time, a synchronous signal may not issue.

In one or more embodiments of the invention, the original instruction is evaluated to determine whether it is a control-flow instruction (i.e., an instruction that affects the value of the program counter). A branch instruction, a function call, and explicit reading of the program counter itself are examples of the control-flow instructions. If the original instruction is a control-flow instruction, then instructions whose semantics depend on the location of the original instruction (i.e., location dependent instructions, instructions that are affected by the value of the program counter) are emulated in software. The program counter as well as any other state in the system that would be modified by the native execution of the traced location-dependent instructions are updated based on the results of the emulation. The trap handler then returns control to the thread at the location indicated by the program counter upon completion of the emulation.

In one embodiment of the invention, the trap handler loads the original instruction and a control transfer instruction into the scratch space prior to executing the original instruction. The control transfer instruction includes the next program counter value (i.e., points the thread to the next instruction in the instrumented program to execute). The next program counter value may be obtained by simply adding the size of the original instruction to the current value of the program counter if the original instruction is not a control-flow instruction, or by performing the emulation process described above.

Once the original instruction and the control transfer instruction have been loaded into the scratch space and the program counter has been updated to point to the scratch memory, the execution facility may proceed to execute the original instruction and the control transfer instruction without having to single-step the original instruction. Thus, once the original instruction has been executed, the thread does not have to pause while the next program counter value is updated. Instead, once execution of the original instruction has been completed, the control transfer instruction updates the program counter and then proceeds to continue executing the instrumented program.

One or more embodiments of the invention provide an efficient means for collecting information about an instrumented program. Specifically, the invention provides a means to collect tracing information in multi-thread environment without losing tracing information. Further, one or more embodiments of the invention provide an efficient means for processing synchronous and asynchronous signals in an instrumented program.

Figure 5:
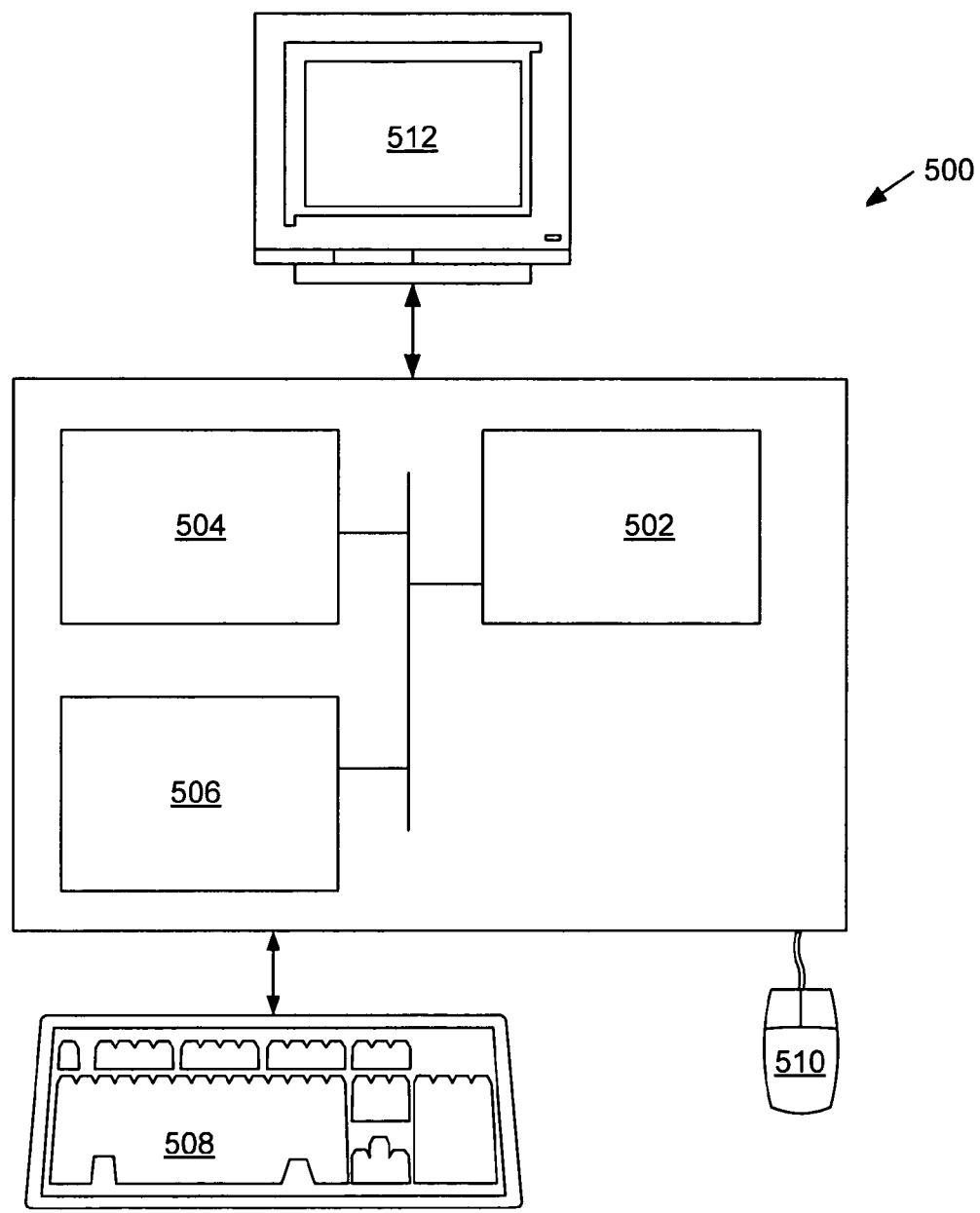
FIG. 5 shows a computer system in accordance with an embodiment of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising software instructions for tracing an instrumented program, the software instructions executable on a processor and comprising functionality for:

transferring control of the instrumented program from a kernel to a trap handler when a probe in the instrumented program is triggered;

obtaining, by the trap handler, an original instruction associated with the probe;

loading, by the trap handler, the original instruction into a scratch space;

beginning, by the trap handler, execution of the original instruction in the scratch space using a thread;

detecting a state of a signal received by a signal handler during the execution of the original instruction, by the trap handler, in the scratch space; and if the state of the signal is asynchronous:

suspending, by the signal handler, execution of a second instruction corresponding to the signal;

inserting, by the signal handler, the signal in the instrumented program after the original instruction;

executing, by the trap handler, the original instruction in the scratch space using the thread;

returning the control of the instrumented program to the kernel; and executing the second instruction corresponding to the signal after executing the original instruction;

if the state of the signal is synchronous, executing a third instruction corresponding to the signal and resetting a program counter to a location of the original instruction where the probe in the instrumented program was triggered.

2. The computer readable medium of claim 1, wherein the second instruction is executed by the signal handler.

3. The computer readable medium of claim 1, wherein the third instruction is executed by the signal handler.

4. The computer readable medium of claim 1, further comprising:

obtaining data by executing the original instruction.

5. The computer readable medium of claim 1, wherein if the state of the signal is synchronous, a traced instruction stream shows that the original instruction is executed twice.

6. The computer readable medium of claim 1, further comprising:

if the state of the signal is synchronous:
calling an exit function; and
displaying a traced instruction stream.

7. The computer readable medium of claim 1, further comprising:

if the state of the signal is synchronous:
modifying one selected from the group consisting of an instruction code and a data register corresponding to the original instruction before resetting the program counter,
wherein when the original instruction re-executes, a second synchronous signal is not received.

8. The computer readable medium of claim 1, further comprising:

if the state of the signal is asynchronous:
adjusting an address range such that the signal handler executes the received signal upon executing the original instruction.

9. The computer readable medium of claim 1, wherein if the state of the signal is asynchronous, a traced instruction stream shows the asynchronous signal after the original instruction.

10. A system for tracing an instrumented program, comprising:

a memory configured to store:
a look-up table arranged to store an address and a corresponding original instruction; and
a scratch space arranged to store the corresponding original instruction;
a processor configured to execute:
the instrumented program using a thread under control of a kernel, wherein the thread transfers control from the kernel to a trap handler when a probe in the instrumented program is triggered;
a trap handler configured to halt execution of the thread when a trap instruction is encountered and use an address of the trap instruction to obtain the corresponding original instruction from the look-up table;
a signal handler configured to detect a state of a received signal during the execution of the original instruction in the scratch space; and
a program counter configured to store a value corresponding to a current address of the thread executing in the instrumented program,
wherein if the state of the received signal is asynchronous, the processor:
suspends, by the signal handler, execution of a second instruction corresponding to the received signal;
inserts, by the signal handler, the received signal in the instrumented program after the corresponding original instruction;
executes, by the trap handler, the corresponding original instruction in the scratch space;
returns the control of the instrumented program to the kernel; and
executes the second instruction corresponding to the received signal upon completing execution of the corresponding original instruction in the scratch space; and
wherein if the state of the received signal is synchronous, the processor resets execution of the thread to the address of the trap instruction.

11. The system of claim 10, wherein the second instruction is executed by the signal handler.

12. The system of claim 10, wherein the program counter is further configured to:

if the state of the received signal is synchronous, execute a third instruction corresponding to the received signal.

13. The system of claim 12, wherein the third instruction is executed by the signal handler.

14. The system of claim 10, further comprising:

an execution facility for executing the corresponding original instruction to obtain data.

15. The system of claim 10, wherein if the state of the received signal is synchronous, a traced instruction stream shows that the corresponding original instruction was executed twice.

16. The system of claim 10, wherein the signal handler is further configured to:

if the state of the received signal is synchronous:
call an exit function; and
display a traced instruction stream.

17. The system of claim 10, wherein the signal handler is further configured to:

if the state of the received signal is synchronous:
modify one selected from the group consisting of an instruction code and a data register corresponding to the original instruction before resetting the program counter,
wherein when the corresponding original instruction re-executes, a second synchronous signal is not received.

18. The system of claim 10, wherein the program counter is further configured to:

if the state of the received signal is asynchronous:
adjust an address range such that the signal handler executes the received signal upon executing the corresponding original instruction.

19. The system of claim 10, wherein if the state of the received signal is asynchronous, a traced instruction stream shows the asynchronous signal after the corresponding original instruction.

* * * * *